US010080126B2

(12) United States Patent
Liao

(10) Patent No.: US 10,080,126 B2
(45) Date of Patent: Sep. 18, 2018

(54) DEVICE OF HANDLING OPEN DIRECT DISCOVERY FOR DEVICE-TO-DEVICE COMMUNICATION

(71) Applicant: HTC Corporation, Taoyuan (TW)

(72) Inventor: Ching-Yu Liao, Taipei (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 14/854,057

(22) Filed: Sep. 15, 2015

(65) Prior Publication Data
US 2016/0080925 A1 Mar. 17, 2016

Related U.S. Application Data

(60) Provisional application No. 62/051,253, filed on Sep. 16, 2014.

(51) Int. Cl.
H04W 4/00 (2018.01)
H04W 8/00 (2009.01)
H04W 4/02 (2018.01)
H04W 76/14 (2018.01)

(52) U.S. Cl.
CPC .......... H04W 8/005 (2013.01); H04W 4/02 (2013.01); H04W 76/14 (2018.02)

(58) Field of Classification Search
CPC ...... H04W 8/005; H04W 4/02; H04W 76/023
See application file for complete search history.

(56) References Cited

U.S. PATENT DOCUMENTS

| 2011/0110308 A1 | 5/2011 | Liang | |
| 2011/0258049 A1 | 10/2011 | Ramer | |
| 2013/0288668 A1 | 10/2013 | Pragada | |
| 2014/0066058 A1 | 3/2014 | Yu | |
| 2014/0254523 A1* | 9/2014 | Chai | H04W 76/02 370/329 |
| 2015/0289127 A1* | 10/2015 | Ou | H04W 8/005 455/426.1 |
| 2017/0079086 A1* | 3/2017 | Kuge | H04W 8/00 |

OTHER PUBLICATIONS

European Search report dated Feb. 2, 2016 for EP application No. 15185487.4.
HTC, "Proposal of supporting revocation feature for the Open Direct Discovery", SA WG2 Meeting #107, S2-150144, Jan. 26-30, 2015, Sorrento, Italy, XP050942121, pp. 1-4.
(Continued)

Primary Examiner — Keith Fang
(74) Attorney, Agent, or Firm — Winston Hsu

(57) ABSTRACT

A communication device for handling an open direct discovery comprises a storage unit for storing instructions and a processing means coupled to the storage unit. The processing means is configured to execute the instructions stored in the storage unit. The instructions comprise receiving a discovery update message from a first proximity service (ProSe) function, wherein the discovery update message indicates a ProSe Application Code corresponding to a discovery filter or a ProSe Application ID corresponding to the ProSe Application Code; and stopping performing an open direct discovery according to the discovery filter.

8 Claims, 6 Drawing Sheets

(56) References Cited

OTHER PUBLICATIONS

Qualcomm Incorporated, Telecom Italia, HTC, "New procedures for Open Direct Discovery", SA WG2 Meeting #107, S2-150597, Jan. 26-30, 2015, Sorrento, Italy, XP050961680, pp. 1-9.
Telecom Italia, Qualcomm Incorporated, Huawei, HiSilicon, "Direct Discovery update—open discovery", 3GPP TSG SA WG2 Metting #110AH, S2-152911, Aug. 31-Sep. 3, 2015, Sophia Antipolis, XP051011848.
Huawei, Hisilicon, "Update of solution D13", 3GPP TSG SA WG2 Metting #101, S2-140178, Nov. 20-24, 2014, Taipei, Taiwan, XP050744513, pp. 1-15.
Intel, "Missing procedure on ProSe Application Code revocation", 3GPP TSG-WG2 Meeting #103, S2-141931, May 19-23, 2014, Phoenix, AZ, USA, XP050836407.
3GPP TS 22.278 V13.0.0 (Jun. 2014) Technical Specification 3rd Generation Partnership Project; Technical Specification Group Services and System Aspects; Service requirements for the Evolved Packet System (EPS) (Release 13).
3GPP TS 23.303 V12.1.0 (Jun. 2014) Technical Specification 3rd Generation Partnership Project; Technical Specification Group Services and System Aspects; Proximity-based services (ProSe); Stage 2 (Release 12).
3GPP TSG-SA WG2 Meeting #104 S2-142856 7—Jul. 11, 2014, Dublin, Ireland (revision of S2-142636) CR-Form-v11 Change Request 23.303 CR 0108 rev 1 Current version: 12.1.0 Title: Clarification of usage of Application ID in ProSe direct Discovery.
3GPP TSG-WG2 Meeting #103 S2-141931 Phoenix, AZ, USA, May 19-23, 2014 CR-Form-v11 Change Request 23.303 CR 0087 Rev—Current version: 12.0.0 Title: Missing procedure on ProSe Application Code revocation.
Office Action dated Aug. 9, 2016 for the Japanese Application No. 2015-182754, filing date Sep. 16, 2015, pp. 1-3.
Telecom Italia, Update of the solution D13, SA WG2 Meeting #100, S2-134456, Nov. 11-15, 2013, pp. 1, 7-11, San Francisco, USA.
Huawei, Hisillicon, Revocation Procedures for ProSe Direct Service, SA WG2 Meeting #103, S2-142206, May 19-23, 2014, pp. 1-5, Phoenix, Arizona, USA.
Office Action dated Sep. 21, 2016 for the Korean Application 10-2015-0131001, filed Sep. 16, 2015, pp. 1-6.
3GPP Technical Report, "3rd Generation Partnership Project; Technical Specification Group Services and System Aspects; Study on architecture enhancements to support Proximity-based Services (ProSe) (Release 12)",3GPP TR 23.703 V12.0.0, Feb. 2014, pp. 20, 23, 26, 31-32, 34-37, 45-48, 63-65, 94, 98-99, 100-101, 106-109, 122, 129-130, 165-166, 230-233, 238-240, 290, 292, 309-311, 313-316, 320-321.
3GPP Technical Report, "3rd Generation Partnership Project; Technical Specification Group Core Network and Terminals; Proximity-services (ProSe) User Equipment (UE) to Proximity-services (ProSe) Function Protocol aspects; Stage 3 (Release 12)", 3GPP TS 24.334 V1.1.0, Jul. 2014, p. 57.
Office action dated Oct. 19, 2016 for the Taiwan application No. 104130682, filing date Sep. 16, 2015, p. 1-13.
Office action dated May 22, 2018 for the China application No. 201510589802.5, filing date Sep. 16, 2015, p. 1-5.

* cited by examiner

DEVICE OF HANDLING OPEN DIRECT DISCOVERY FOR DEVICE-TO-DEVICE COMMUNICATION

CROSS REFERENCE TO RELATED APPLICATIONS

This application claims the benefit of U.S. Provisional Application No. 62/051,253, filed on Sep. 16, 2014 and incorporated herein by reference.

BACKGROUND OF THE INVENTION

1. Field of the Invention

The present invention relates to a communication device used in a wireless communication system, and more particularly, to a communication device of handling an open direct discovery for device-to-device communication in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

According to the prior art, a monitoring UE consumes power on performing an open direct discovery to monitor a ProSe Application Code broadcasted by an announcing UE, if the monitoring UE has been allocated a discovery filter including the ProSe Application Code. However, the ProSe Application Code may be out of date. That is, the announcing UE has stopped the open direct discovery, and the ProSe Application Code has become invalid. The monitoring UE will continue to consume the power unnecessarily, if the open direct discovery which has been stopped is not processed properly by the monitoring UE, the announcing UE and/or related ProSe function(s).

Thus, how to handle the open direct discovery which has been stopped is an important problem to be solved.

SUMMARY OF THE INVENTION

The present invention therefore provides a method and related communication device for handling an open direct discovery for device-to-device communication to solve the abovementioned problem.

A communication device for handling an open direct discovery comprises a storage unit for storing instructions and a processing means coupled to the storage unit. The processing means is configured to execute the instructions stored in the storage unit. The instructions comprise receiving a discovery update message from a first proximity service (ProSe) function, wherein the discovery update message indicates a ProSe Application Code corresponding to a discovery filter or a ProSe Application ID corresponding to the ProSe Application Code; and stopping performing an open direct discovery according to the discovery filter.

A communication device for handling an open direct discovery comprises a storage unit for storing instructions and a processing means coupled to the storage unit. The processing means is configured to execute the instructions stored in the storage unit. The instructions comprise transmitting an update message for updating a proximity service (ProSe) Application Code to a ProSe function, if at least one of the following operations occur: a reception of an announce revocation request message indicating a ProSe Application Code or a ProSe Application ID corresponding to the ProSe Application Code from an announcing user equipment (UE), a transmission of a discovery termination request message to the announcing UE, or a determination of the announcing UE being out of a coverage area of the open direct discovery when a periodic active timer expires and the announcing UE does not transmit an activity report message to the network node within a guard time interval.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
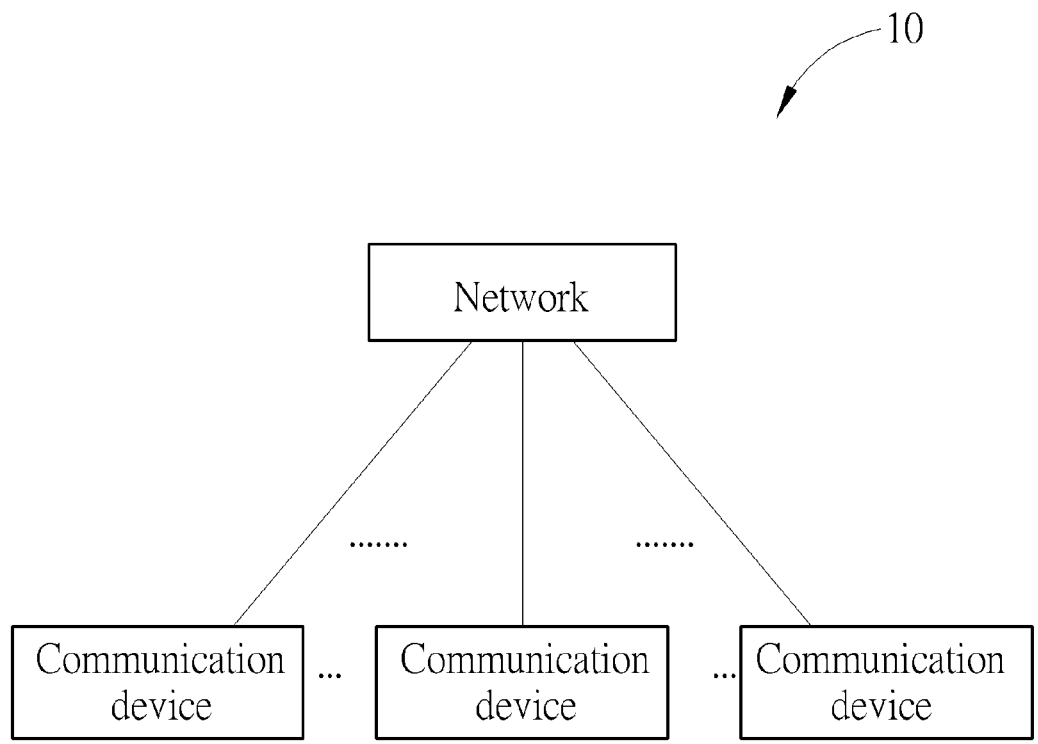
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. A communication device may communicate with the network according to a device-to-cellular (D2C) communication defined in a communication standard, e.g., the 3rd Generation Partnership Project (3GPP) standard. Practically, the network can be a universal terrestrial radio access network (UTRAN) comprising at least one Node-B (NB) in a universal mobile telecommunications system (UMTS). In another example, the network can be an evolved UTRAN (E-UTRAN) comprising at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network (e.g., evolved packet core (EPC) network), wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) device, a mobile phone, a laptop, a tablet computer, an electronic book, a portable computer system, or combination thereof. In addition, for the D2C communication, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In addition, two communication devices may communicate with each other directly, after an initialization (e.g., connection establishment and/or peer discovery) is performed. For example, the initialization may be assisted by the network. That is, the communication devices may communicate (e.g., transmit and/or receive packets) with each other according to a D2D communication (e.g., proximity service (ProSe)) defined in a communication standard, e.g., the 3GPP standard. The communication devices may communicate with each other via UL subframes determined according to frequency-division duplexing (FDD) configuration and/or time-division duplexing (TDD) configurations.

Figure 2:
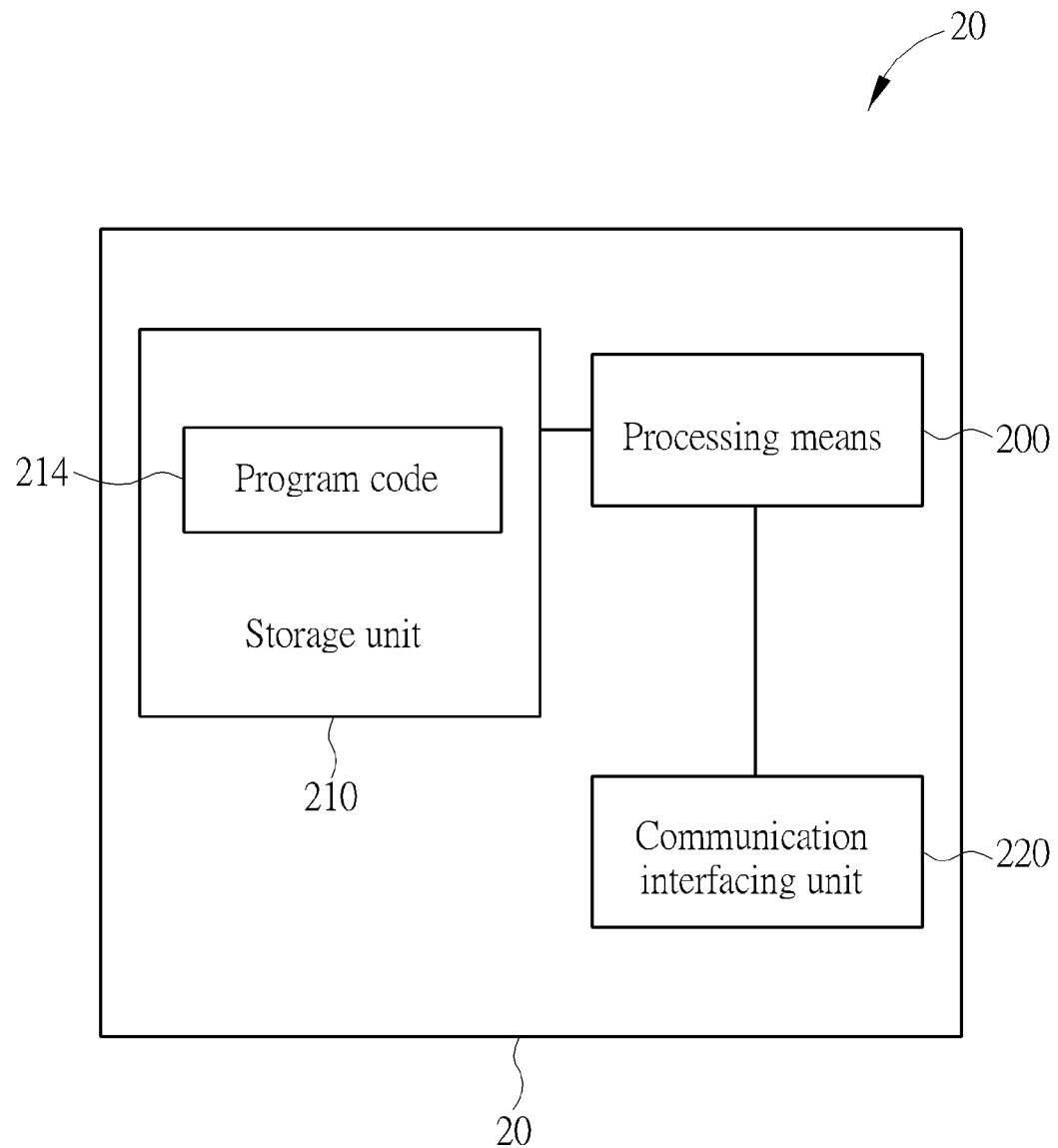
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
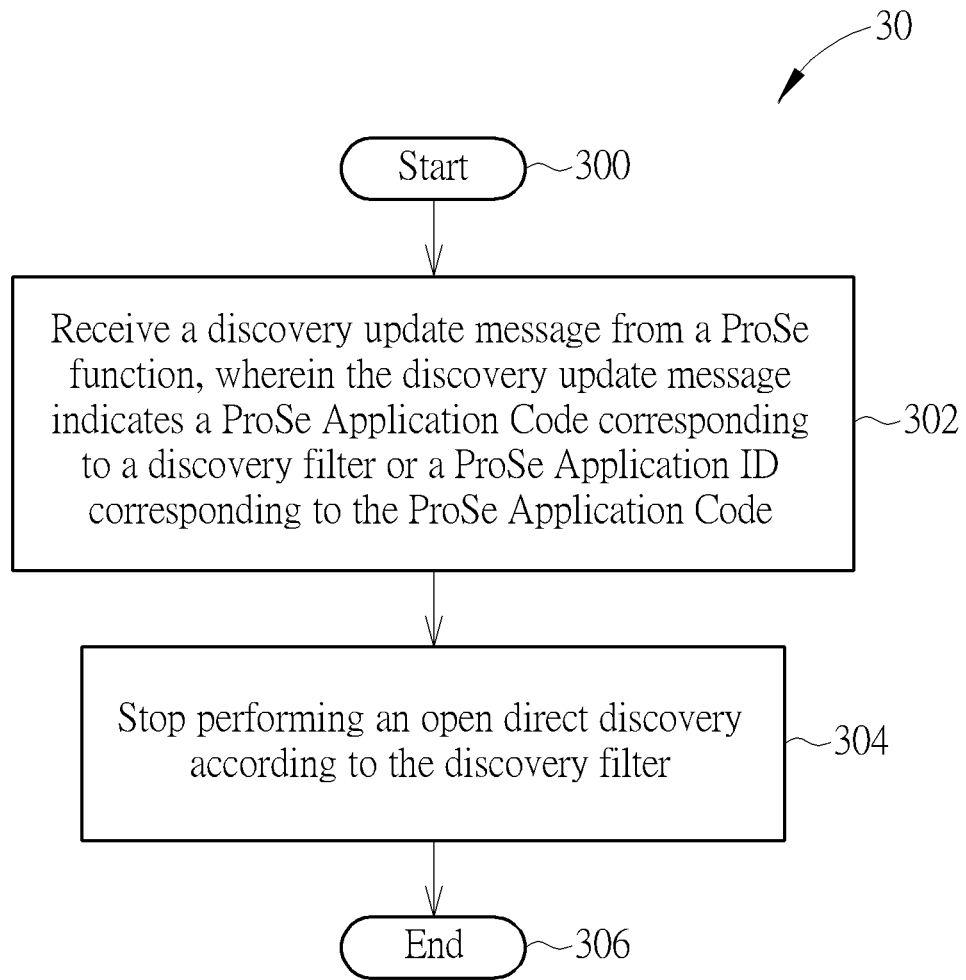
FIG. 3 is a flowchart of a process according to an example of the present invention.

FIG. 3 is a flowchart of a process 30 according to an example of the present invention. The process 30 may be utilized in a monitoring UE (e.g., a communication device in FIG. 1), to handle an open direct discovery. The process 30 may be compiled into the program code 214 and includes the following steps:

Step 300: Start.

Step 302: Receive a discovery update message from a ProSe function, wherein the discovery update message indicates a ProSe Application Code corresponding to a discovery filter or a ProSe Application identification (ID) corresponding to the ProSe Application Code.

Step 304: Stop performing an open direct discovery according to the discovery filter.

Step 306: End.

According to the process 30, the monitoring UE may receive a discovery update message from a ProSe function, wherein the discovery update message indicates a ProSe Application Code corresponding to a discovery filter or a ProSe Application ID corresponding to the ProSe Application Code. Then, the monitoring UE may stop performing an open direct discovery according to the discovery filter. That is, the ProSe function may notify the monitoring UE to stop performing the open direct discovery, e.g., to stop monitoring the ProSe Application Code included in the discovery filter. Thus, the process 30 provides a mechanism for stopping the operation related to the ProSe Application Code, if an announcing UE has stopped the usage of the ProSe Application Code or the ProSe Application Code has become invalid, e.g., due to an expiration of a timer. As a result, power consumption of the monitoring UE can be reduced.

Realization of the present invention is not limited to the above description. The following examples can be applied to the process 30 and/or the processes 40, 50 and 60 in the later description.

In one example, the ProSe function in the process 30 may be in a home public land mobile network (HPLMN) of the monitoring UE. In one example, the ProSe Application Code may be generated by another ProSe function, and may be indicated to an announcing UE in an announce response message, after the other ProSe function receives an announce request message indicating the ProSe Application ID. Further, the other ProSe function may be in a HPLMN of the announcing UE. In one example, the monitoring UE may delete the discovery filter, to stop performing the open direct discovery. In one example, the monitoring UE may replace the discovery filter with another discovery filter including another ProSe Application Code. Further, the other discovery filter may be included in the discovery update message, and the monitoring UE may perform the replacement according to the discovery update message. In one example, the monitoring UE may receive the discovery update message from the ProSe function, when the monitoring UE is in a connected mode or when the monitoring UE performs a procedure with the ProSe function. That is, a time instant at which the monitoring UE receives the discovery update message is not limited.

In one example, the ProSe function may transmit the discovery update message to the monitoring UE, when the ProSe function receives an update message for the ProSe Application Code from another ProSe function (e.g., in the HPLMN of the announcing UE). In the present example, the monitoring UE has requested monitoring with the ProSe Application ID in a monitor request message, and obtains the discovery filter in a monitor response message, wherein the monitoring UE may be identified by the ProSe function according to stored information of an UE identity of the monitoring UE. In one example, the ProSe function may store the information of the UE identity of the monitoring UE, after the ProSe function successfully transmits the monitor response message including the discovery filter to the monitoring UE. In one example, the ProSe function may delete the information of the UE identity of the monitoring UE, after the ProSe function successfully transmits the discovery update message. In one example, the update message may indicate the ProSe Application ID or the discovery filter, e.g., to be deleted by the monitoring UE. In one example, the update message may indicate another discovery filter including another ProSe Application Code, e.g., to be used by the monitoring UE for replacing the original discovery filter and/or the original ProSe Application Code. Then, the monitoring UE may perform monitoring using the other discovery filter. The other discovery filter may include a new ProSe Application Code which replaces the original ProSe Application Code.

It should be noted that although the examples are illustrated based on the process 30, to clarify the operations of the announcing UE, the monitoring UE, and the ProSe functions. The examples can be combined and/or modified arbitrarily according to system requirements and/or design considerations.

Figure 4:
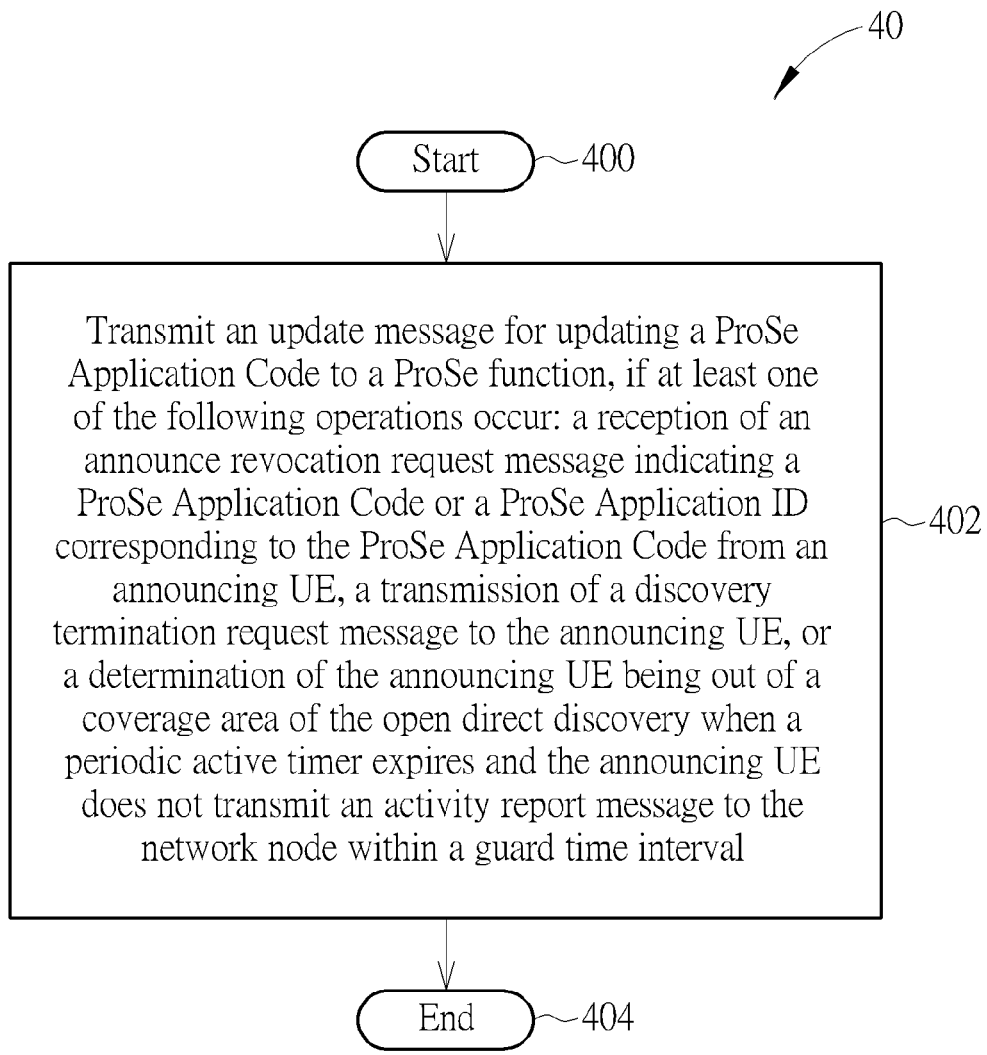
FIG. 4 is a flowchart of a process according to an example of the present invention.

FIG. 4 is a flowchart of a process 40 according to an example of the present invention. The process 40 may be utilized in a network node (e.g., operated in the network in FIG. 1), to handle an open direct discovery. The process 40 may be compiled into the program code 214 and includes the following steps:

Step 400: Start.

Step 402: Transmit an update message for updating a ProSe Application Code to a ProSe function, if at least one of the following operations occur: a reception of an announce revocation request message indicating a ProSe Application Code or a ProSe Application ID corresponding to the ProSe Application Code from an announcing UE, a transmission of a discovery termination request message to the announcing UE, or a determination of the announcing UE being out of a coverage area of the open direct discovery when a periodic active timer expires and the announcing UE does not transmit an activity report message to the network node within a guard time interval.

Step 404: End.

According to the process 40, the network node (e.g., a ProSe function of an announcing UE) may transmit an update message for updating a ProSe Application Code to a ProSe function (e.g., of a monitoring UE), if at least one of the following operations occur: a reception of an announce revocation request message indicating a ProSe Application Code or a ProSe Application ID corresponding to the ProSe Application Code from an announcing user equipment (UE), a transmission of a discovery termination request message to the announcing UE, or a determination of the announcing UE being out of a coverage area of the open direct discovery when a periodic active timer expires and the announcing UE does not transmit an activity report message to the network node within a guard time interval. That is, the network node may transmit the update message to the ProSe function, if one or more of the three operations occur. Thus, the ProSe function may transmit a discovery update message to the monitoring UE after receiving the update message, as stated previously. Then, the monitoring UE stops performing the open direct discovery (i.e., stops monitoring of the ProSe Application Code) according to a discovery filter in the discovery update message. Thus, the process 40 provides a mechanism for stopping the operation related to the ProSe Application Code, if an announcing UE has stopped the usage of the ProSe Application Code or the ProSe Application Code has become invalid, e.g., due to an expiration of a timer. As a result, power consumption of the monitoring UE can be reduced.

Realization of the present invention is not limited to the above description. The following examples can be applied to the processes 30 and 40 and/or the processes 50 and 60 in the later description.

In one example, the network node in the process 40 may resolve the ProSe Application ID according to a mapping between the ProSe Application ID and the ProSe Application Code stored in a mapping table, if the ProSe Application Code is indicated in the update message. In one example, the announcing UE may transmit the announce revocation request message to the network node, when the announcing UE determines to stop announcement of the ProSe Application Code. In one example, the determination may be made, because a ProSe layer of the announcing UE receives a termination request indicating stopping the announcement of the ProSe Application ID from an upper layer of the announcing UE. The ProSe layer of the announcing UE may receive the termination request, if an application on the announcing UE decides to stop the open direct discovery related to the ProSe Application ID. Further, the application may be identified by an application ID which may be corresponding to one or more ProSe Application IDs.

In one example, the network node in the process 40 may transmit the update message to the ProSe function for updating the ProSe Application Code, after receiving a notification message from a home subscriber server (HSS) (e.g., home location register (HLR)). In one example, the HSS may transmit the notification message, when the HSS initiates a detach procedure for the announcing UE. In one example, the HSS may transmit the notification message, when a notification flag stored in the HSS is set as active and the HSS is notified of a detachment of the announcing UE by a network controller (e.g., MME). Further, the notification flag may be set as active, when the HSS receives a detach notification request message indicating a setting of the notification flag from the network node. Note that the detachment of the announcing UE may be detected in the following scenarios. The announcing UE initiates a detach procedure to detach from an evolved packet system (EPS) network, e.g., power off, etc. A network controller (e.g., MME) initiates a detach procedure or a local detach with the announcing UE. In one example, the notification flag may be set as inactive in the HSS, when the HSS receives another detach notification request message indicating an UE identity of the announcing UE as well as the notification flag from the network node, if there is no valid allocated ProSe Application Code for the announcing UE, i.e., all of the allocated ProSe Application codes are invalid due to the expiration of the corresponding validity timers.

In one example, a value of the periodic active timer in the process 40 may be indicated by the network node in an announce response message, or may be indicated by the announcing UE in an announce request message. In one example, a value of the guard time interval may be configured by a network controller (e.g., MME).

In one example, the network node may terminate (e.g., deactivate) an authorization of the ProSe Application Code. In one example, the network node may terminate (e.g., deactivate) authorization(s) of all ProSe Application Code(s) corresponding to all ProSe Application ID(s). In one example, the network node may replace the ProSe Application Code with another ProSe Application Code.

In one example, the network node in the process 40 may determine whether to transmit the update message to the ProSe Function according to stored address information of the ProSe Function. Further, the network node may store the address information of the ProSe function, after receiving a monitor request message including the ProSe Application ID from the ProSe function and returning the ProSe Application Code in a monitor response message to the ProSe Function.

Figure 5:
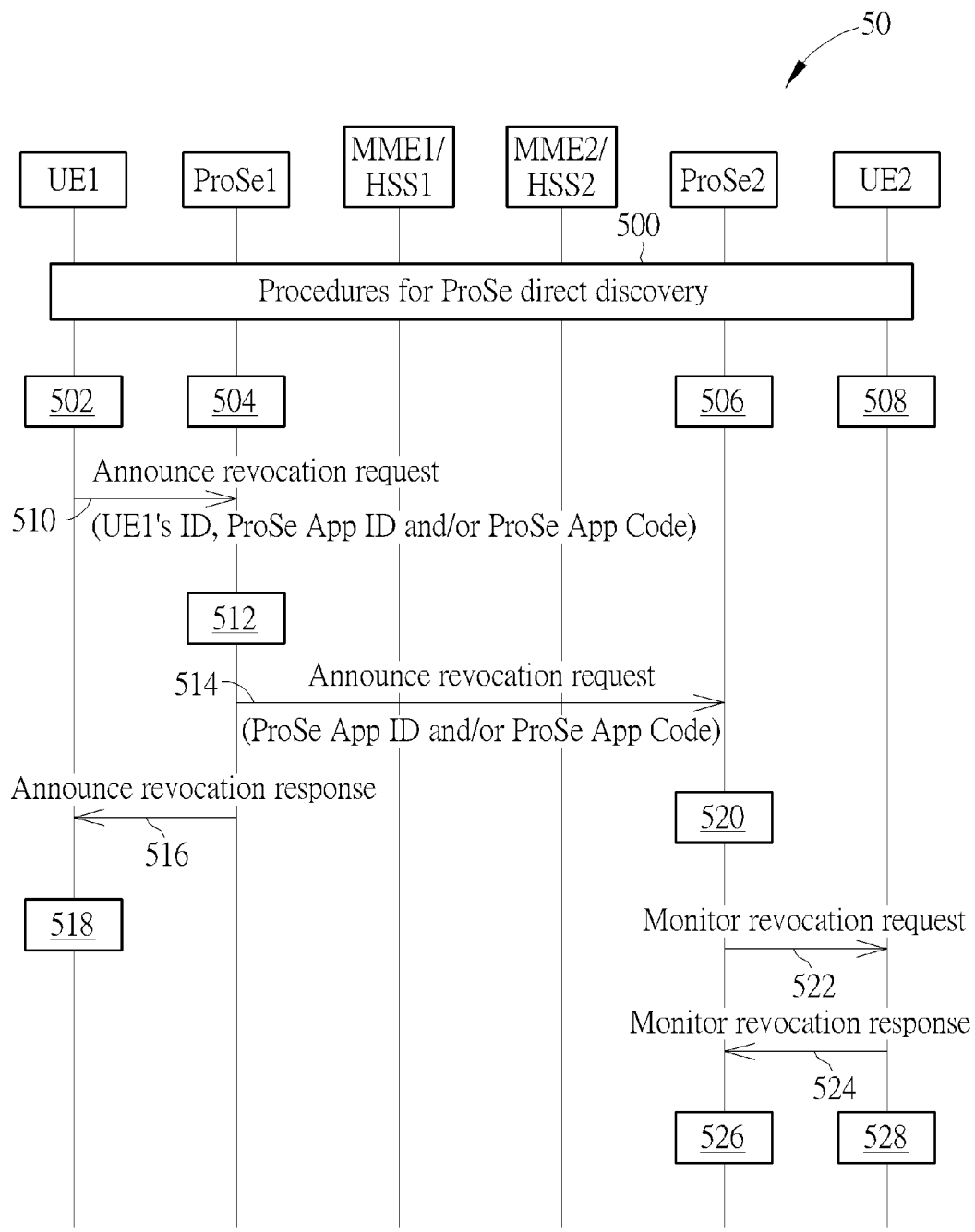
FIG. 5 is a flowchart of a process according to an example of the present invention.

FIG. 5 is a flowchart of a process 50 according to an example of the present invention, where network entities such as UEs UE1-UE2, ProSe functions ProSe1-ProSe2, and MMEs/HSSs MME1/HSS1-MME2/HSS2 are shown. In the present example, the UE UE1 may be an announcing UE, and the UE UE2 may be a monitoring UE. The ProSe function ProSe1 may be a ProSe function of a HPLMN of the UE UE1, and the ProSe function ProSe2 may be a ProSe function of a HPLMN of the UE UE2. The configurations of the network entities are simplified for ease of the illustration, and are not limited herein.

Operation of the process 50 is described as follows. The UEs UE1-UE2 and the ProSe functions ProSe1-ProSe2 may perform a ProSe direct discovery procedure to realize open direct discovery (step 500). The ProSe direct discovery procedure may include service authorization procedure (s) performed by the UEs UE1-UE2 and the ProSe functions ProSe1-ProSe2, and transmission (s)/reception(s) of discovery request message(s) and match report(s). Then, the UEs UE1-UE2 and the ProSe functions ProSe1-ProSe2 may obtain information related to the open direct discovery. In one example, the UE UE1 may store a ProSe Application Code corresponding to (e.g., subject to) a ProSe Application ID (step 502). In one example, the ProSe function ProSe1 may store address information of the ProSe function ProSe2 associated with the ProSe Application Code or the ProSe Application ID (step 504). In one example, the ProSe function ProSe2 may store a mapping between the ProSe Application ID and the ProSe Application Code and information (e.g., IDs) of monitoring UEs (e.g., the UE UE2) (step 506). In one example, the UE UE2 may store a mapping between the ProSe Application ID and a discovery filter (step 508).

The UE UE1 may transmit an announce revocation request message to the ProSe function ProSe1 to terminate (e.g., deactivate) the ProSe Application Code (step 510). The announce revocation request message may include information (e.g., ID) of the UE UE1, the ProSe Application ID and/or the ProSe Application Code. The ProSe function ProSe1 may confirm (or check) whether the ProSe Application ID and/or the ProSe Application Code is requested (step 512). The ProSe function ProSe1 may transmit the announce revocation request message to the ProSe function ProSe2 according to the address information of the ProSe function ProSe2 after the confirmation (step 514). In addition, the ProSe function ProSe1 may transmit an announce revocation response message to the UE UE1 in response to the processing of the announce revocation request message (step 516). The UE UE1 may confirm that the ProSe Application Code is invalid according to the announce revocation response message, and may stop announcing the ProSe Application Code (step 518).

The ProSe function ProSe2 may confirm (or check) whether the UE UE2 requests the ProSe Application Code according to the information of the UE UE2 after receiving the announce revocation request message (step 520). The ProSe function ProSe2 may transmit a monitor revocation request message to the UE UE2 to notify that the ProSe Application Code is terminated after the confirmation (step 522). The ProSe function ProSe2 may receive a monitor revocation response message from the UE UE2 in response to the monitor revocation request message (step 524). Then, the ProSe function ProSe2 may delete information related to the ProSe Application Code according to the monitor revocation response message (step 526). In addition, the UE UE2 may confirm that the ProSe Application Code is invalid, and may stop monitoring the ProSe Application Code (step 528).

Figure 6:
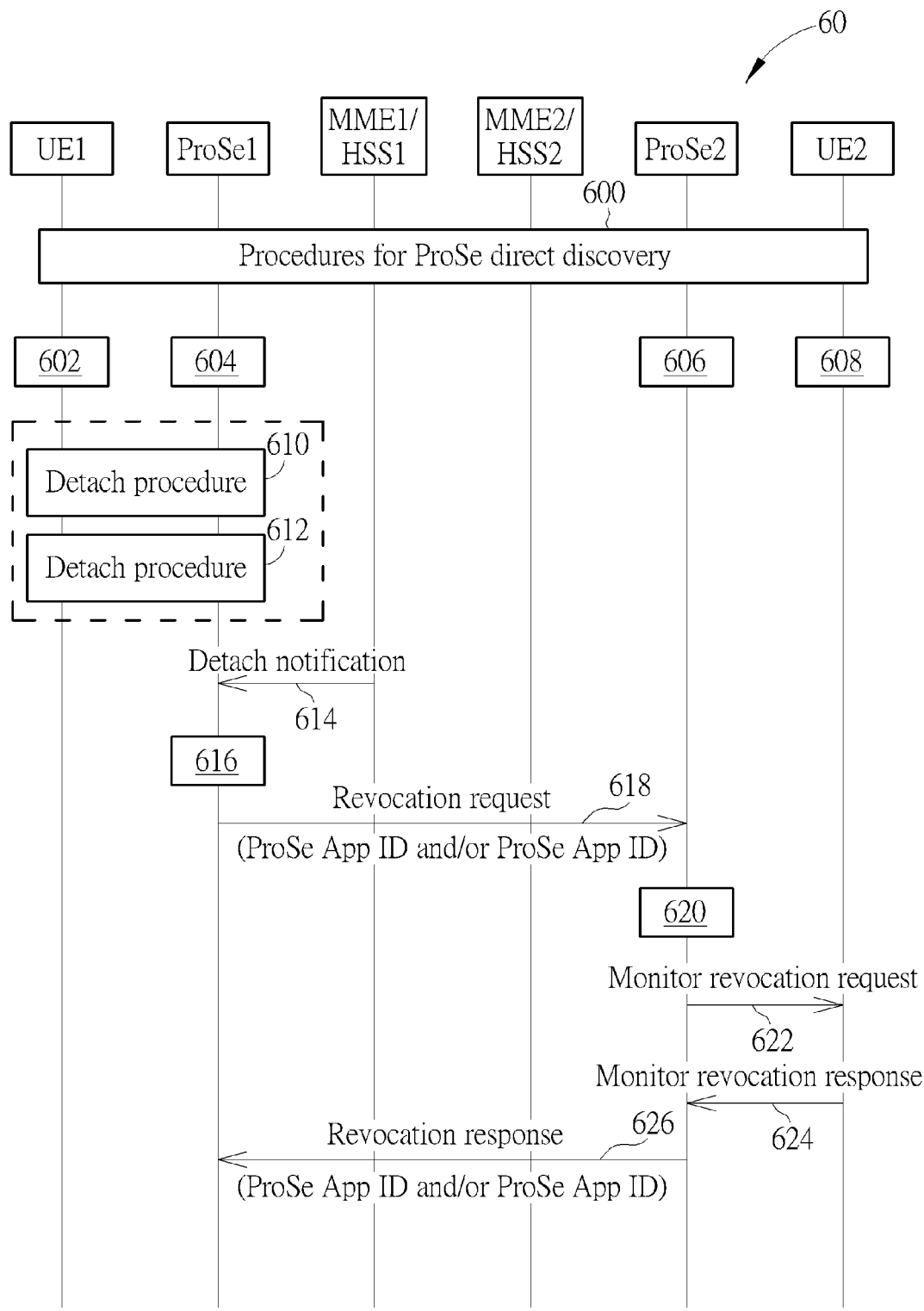
FIG. 6 is a flowchart of a process according to an example of the present invention.

FIG. 6 is a flowchart of a process 60 according to an example of the present invention, where network entities such as UEs UE1-UE2, ProSe functions ProSe1-ProSe2, and MMEs/HSSs MME1/HSS1-MME2/HSS2 are shown. In the present example, the UE UE1 may be an announcing UE, and the UE UE2 may be a monitoring UE. The ProSe function ProSe1 may be a ProSe function of a HPLMN of the UE UE1, and the ProSe function ProSe2 may be a ProSe function of a HPLMN of the UE UE2. The configurations of the network entities are simplified for ease of the illustration, and are not limited herein.

Operation of the process 60 is described as follows. The UEs UE1-UE2 and the ProSe functions ProSe1-ProSe2 may perform one or more ProSe direct discovery procedures to realize open direct discovery (step 600). The one or more ProSe direct discovery procedures may include service authorization procedure(s) performed by the UEs UE1-UE2 and the ProSe functions ProSe1-ProSe2, and transmission(s)/reception(s) of one or more discovery request messages and match reports. Then, the UEs UE1-UE2 and the ProSe functions ProSe1-ProSe2 may obtain information related to the open direct discovery. In one example, the UE UE1 may store a ProSe Application Code corresponding to (e.g., subject to) a ProSe Application ID (step 602). In one example, the ProSe function ProSe1 may store address information of the ProSe function ProSe2 associated with the ProSe Application Code or the ProSe Application ID (step 604). In one example, the ProSe function ProSe2 may store a mapping between the ProSe Application ID and the ProSe Application Code and information (e.g., IDs) of monitoring UEs (e.g., the UE UE2) (step 606). In one example, the UE UE2 may store a mapping between the ProSe Application ID and a discovery filter (step 608).

A detach procedure may be performed between the UE UE1 and/or the MME/HSS MME1/HSS1 to detach the UE UE1 from the network (step 610). The detach procedure may be initiated by the UE UE1, or may be initiated by the ProSe function ProSe1. The detach procedure may be a local detach procedure initiated by the MME/HSS MME1/HSS1 to detach the UE UE1 from the network (612). In either case, the HSS HSS1 may transmit a detach notification message to the ProSe function ProSe1 (614). The ProSe function ProSe1 may confirm (or check) whether the UE UE1 has been allocated the ProSe Application Code according to the detach notification message (616). Then, the ProSe function ProSe1 may transmit a revocation request message to the ProSe function ProSe2 after the confirmation (618). The revocation request message may include the ProSe Application ID and/or the ProSe Application Code.

The ProSe function ProSe2 may or may not confirm (or check) whether the UE UE2 requests the ProSe Application Code according to the information of the UE UE2 after receiving the revocation request message (step 620). The ProSe function ProSe2 may transmit a monitor revocation request message to the UE UE2, to notify that the ProSe Application Code is terminated, e.g., due to the detachment of the UE UE1 (step 622). The ProSe function ProSe2 may receive a monitor revocation response message from the UE UE2 in response to the monitor revocation request message (step 624). The ProSe function ProSe2 may or may not transmit a revocation response message to the ProSe function ProSe1 in response to the revocation request message (step 626).

Note that a ProSe function may transmit a discovery request update message to a UE (e.g., announcing UE or monitoring UE) to update or revoke a ProSe Application code, a validity timer or a discovery filter. The discovery request update message may include a discovery entry ID, and the ProSe function to revoke or update the corresponding entry at the UE side according to the discovery entry ID. The ProSe function may include a new ProSe Application Code, a corresponding validity timer and the discovery entry ID in the discovery request update message, if the ProSe function needs to update an allocated ProSe Application Code to the announcing UE. The ProSe function may only include the discovery entry ID to revoke the old code. The ProSe function may include new Discovery filter(s) and the discovery entry ID to replace old discovery filter(s). The ProSe function may only include the discovery filter ID to revoke the discovery filter. For the monitoring UE, it may be optional to include discovery filter ID(s), if the ProSe function only remove certain filter(s) rather than others.

It should be noted that although the examples are illustrated based on the process 30, 40, 50 and/or 60, to clarify the operations of the announcing UE, the monitoring UE, the ProSe functions, and the HSSs. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related communication device for handling an open direct discovery. A monitoring UE and/or a ProSe function can know whether a ProSe Application Code broadcasted by an announcing UE is invalid, e.g., due to a detachment of the announcing UE. As a result, power consumption of the monitoring UE can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling an open direct discovery, comprising:
   a storage device for storing instructions of:
   receiving a Discovery Update message from a first proximity service (ProSe) function, wherein the Discovery Update message is a message that notifies the communication device to stop monitoring an open direct discovery corresponding to a discovery filter and the Discovery Update message indicates a ProSe Application Code corresponding to the discovery filter or a ProSe Application ID corresponding to the ProSe Application Code that is deleted from the communication device;
   stopping monitoring the open direct discovery according to the discovery filter; and;
   replacing the discovery filter with other discovery filter comprising other ProSe Application Code, if the Discovery Update message indicates another discovery filter comprising another ProSe Application Code; and
   a processing circuit, coupled to the storage device, configured to execute the instructions stored in the storage device.

2. The communication device of claim 1, wherein the first ProSe function is in a home public land mobile network (HPLMN) of the communication device.

3. The communication device of claim 1, wherein the ProSe Application Code is generated by a second ProSe function, and is indicated to an announcing user equipment (UE) in an announce response message, after the second ProSe function receives an announce request message indicating the ProSe Application ID.

4. The communication device of claim 1, wherein the instructions further comprise:

deleting the discovery filter.

5. The communication device of claim 1, wherein the communication device receives the Discovery Update message from the first ProSe function, when the communication device is in a connected mode or when the communication device performs a procedure with the first ProSe function.

6. The communication device of claim 1, wherein the first ProSe function transmits the Discovery Update message to the communication device, when the first ProSe function receives an update message for the ProSe Application Code from a second ProSe function.

7. The communication device of claim 6, wherein the update message indicates the ProSe Application ID or the discovery filter.

8. The communication device of claim 6, wherein the update message indicates another discovery filter comprising another ProSe Application Code.

* * * * *